(12) United States Patent
Ishizaki

(10) Patent No.: US 10,459,817 B2
(45) Date of Patent: *Oct. 29, 2019

(54) EVALUATING PERFORMANCE IMPROVEMENT OF EXECUTING INSTRUCTIONS IN A FIRST PROCESSOR OVER EXECUTION ON A SECOND PROCESSOR

(71) Applicant: INTERNATIONAL BUSINESS MACHINES CORPORATION, Armonk, NY (US)

(72) Inventor: Kazuaki Ishizaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/409,241

(22) Filed: Jan. 18, 2017

(65) Prior Publication Data

US 2018/0203783 A1     Jul. 19, 2018

(51) Int. Cl.
  *G06F 11/34*  (2006.01)
  *G06F 9/445*  (2018.01)
  *G06F 11/30*  (2006.01)
  *G06F 9/455*  (2018.01)

(52) U.S. Cl.
  CPC ...... *G06F 11/3409* (2013.01); *G06F 9/44505* (2013.01); *G06F 9/45516* (2013.01); *G06F 11/3024* (2013.01)

(58) Field of Classification Search
  None
  See application file for complete search history.

(56) References Cited

U.S. PATENT DOCUMENTS

| 6,332,190 | B1 | 12/2001 | Hara |
| 9,235,387 | B1 | 1/2016 | Cizek et al. |
| 2005/0086660 | A1* | 4/2005 | Accapadi ............... G06F 9/4881 718/107 |
| 2007/0255929 | A1* | 11/2007 | Kasahara ............... G06F 1/3203 712/1 |
| 2008/0288941 | A1 | 11/2008 | Adams et al. |

(Continued)

OTHER PUBLICATIONS

Frost, Gary, AMD Fusion Developer Summit, "APARAP", Java platform's 'Write Once Run Anywhere'® now includes the GPU, Jun. 2011, 40 pages.

(Continued)

*Primary Examiner* — Danny Chan
(74) *Attorney, Agent, or Firm* — Tutunjian & Bitetto, P.C.; Vazken Alexanian

(57) ABSTRACT

A method for improving performance of a system including a first processor and a second processor includes obtaining a code region specified to be executed on the second processor, the code region including a plurality of instructions, calculating a performance improvement of executing at least one of the plurality of instructions included in the code region on the second processor over executing the at least one instruction on the first processor, removing the at least one instruction from the code region in response to a condition including that the performance improvement does not exceed a first threshold, and repeating the calculating and the removing to produce a modified code region specified to be executed on the second processor.

16 Claims, 10 Drawing Sheets

(56) References Cited

U.S. PATENT DOCUMENTS

| | | | | |
|---|---|---|---|---|
| 2010/0005468 | A1* | 1/2010 | Chang | G06F 9/5083 718/102 |
| 2011/0209128 | A1* | 8/2011 | Nikara | G06F 8/47 717/140 |
| 2011/0289507 | A1* | 11/2011 | Khan | G06F 8/451 718/104 |
| 2012/0096240 | A1* | 4/2012 | Accapadi | G06F 12/0862 712/207 |
| 2013/0268937 | A1* | 10/2013 | Woo | G06F 9/5044 718/102 |
| 2014/0282565 | A1* | 9/2014 | Jaleel | G06F 9/5044 718/102 |
| 2014/0359633 | A1* | 12/2014 | Breternitz | G06F 9/5094 718/104 |
| 2014/0380289 | A1* | 12/2014 | Kalogeropulos | G06F 8/443 717/152 |
| 2015/0116340 | A1 | 4/2015 | Nagai | |
| 2015/0199787 | A1 | 7/2015 | Pechanec et al. | |
| 2015/0205614 | A1* | 7/2015 | Lahteenmaki | G06F 9/5083 712/215 |
| 2015/0302219 | A1* | 10/2015 | Lahteenmaki | G06F 21/74 726/29 |
| 2016/0077871 | A1* | 3/2016 | Kaplan | G06F 1/329 718/102 |
| 2016/0378661 | A1* | 12/2016 | Gray | G06F 9/30043 712/237 |
| 2018/0052693 | A1* | 2/2018 | Sankaralingam | G06F 9/5044 |

OTHER PUBLICATIONS

Baghsorkhi, et al., "An Adaptive Performance Modeling Tool for GPU Architectures", PPoPP'10, Jan. 2010, pp. 105-114.

Dollinger, et al, "CPU+GPU Load Balance Guided by Execution Time Prediction", IMPACT 2015, Fifth International Workshop on Polyhedral Compilation Techniques, Jan. 2015, 9 pages.

Dubach, et al., "Fast Compiler Optimisation Evaluation Using Code-Feature Based Performance Prediction", CF'07, ACM, May 2007, pp. 131-141.

Leung, et al.. "Automatic Parallelization for Graphics Processing Units in JikesRVM", Jun. 2008, 89 pages.

Wu, et al., "GPGPU Performance and Power Estimation Using Machine Learning", IEEE, Feb. 2015, pp. 564-576.

Zaremba, et al., "JaBEE—Framework for Object-oriented Java Bytecode Compilation and Execution on Graphics Processor Units", GPGPU-5, Mar. 2012, pp. 74-83.

U.S. Office Action issued in U.S. Appl. No. 15/803,043 dated Jan. 11, 2019, 20 pages.

U.S. Office Action issued on U.S. Appl. No. 15/803,043 dated Jun. 19, 2019, 25 pages.

* cited by examiner

EVALUATING PERFORMANCE IMPROVEMENT OF EXECUTING INSTRUCTIONS IN A FIRST PROCESSOR OVER EXECUTION ON A SECOND PROCESSOR

BACKGROUND

Technical Field

The present invention relates to improving performance of a system including a first processor and a second processor.

Description of the Related Art

Efficiency gains (e.g. increased processing speed) can be realized by executing software or application code on multiple different processors. For example, application code to be executed on a CPU may have highly parallel regions of code that could benefit from the fragment-based processing of a Graphics Processing Unit (GPU). See, for example, Leung, Alan Chun-Wai, "Automatic Parallelization for Graphics Processing Units in JikesRVM," Waterloo, Ontario, Canada, 2008 ("Leung"). In general, attempts to utilize a CPU and GPU in this way by compiling portions of the code to GPU code have drawbacks due to the fact that certain instructions, such as virtual method call, require extra cost for their preparation and execution, requiring additional data transfer. In some cases, after additional data transfer has been performed, a conditional operation may not even be executed, resulting in an inefficient increase in processing time.

For example, one such attempt, Java Bytecode Execution Environment (JaBEE) generates GPU native code from Java bytecode and supports virtual method call, but the use of virtual method call in JaBEE requires additional data transfer that inefficiently increases the processing time, regardless of whether the instruction will actually be executed. See, for example, Zaremba, Wojciech et al., "JaBEE—Framework for Object-oriented Java Bytecode Compilation and Execution on Graphics Processor Units," Proceedings of the 5th Annual Workshop on General Purpose Processing with Graphics Processing Units (GPGPU-5, New York, N.Y., 2012, pp. 74-83 ("Zaremba").

Other attempts, such as Aparapi, do not support virtual method call. See, for example, Frost, Gary, "APARAPI: Java™ platform's 'Write Once Run Anywhere'® now includes the GPU" AMD Fusion[11] Developer Summit, June 2011, pp. 1-40 ("AMD").

While Leung considers data transfer in his cost model, his cost model is limited to evaluating loops.

SUMMARY

Therefore, it is an object of an aspect of the innovations herein to provide a method capable of overcoming the above drawbacks accompanying the related art. The above and other objects can be achieved by the combinations recited in the claims. A first aspect of the innovations herein may include a method for improving performance of a system including a first processor and a second processor comprising obtaining a code region specified to be executed on the second processor, the code region including a plurality of instructions, calculating a performance improvement of executing at least one of the plurality of instructions included in the code region on the second processor over executing the at least one instruction on the first processor, removing the at least one instruction from the code region in response to a condition including that the performance improvement does not exceed a first threshold, and repeating the calculating and the removing to produce a modified code region specified to be executed on the second processor.

A second aspect of the innovations herein may include a computer program product comprising a computer readable storage medium having program instructions embodied therewith, the program instructions executable by a processor or programmable circuitry to cause the processor or programmable circuitry to perform operations for improving performance of a system including a first processor and a second processor, the operations comprising obtaining a code region specified to be executed on the second processor, the code region including a plurality of instructions, calculating a performance improvement of executing at least one of the plurality of instructions included in the code region on the second processor over executing the at least one instruction on the first processor, removing the at least one instruction from the code region in response to a condition including that the performance improvement does not exceed a first threshold, and repeating the calculating and the removing to produce a modified code region specified to be executed on the second processor.

A third aspect of the innovations herein may include an apparatus comprising the above computer program product and a processor or programmable circuitry for executing the program instructions.

A fourth aspect of the innovations herein may include an apparatus comprising the above computer program product and the first processor, wherein the first processor executes the program instructions. The apparatus may further comprise the second processor.

A fifth aspect of the innovations herein may include an apparatus for improving performance of a system including a first processor and a second processor, the apparatus comprising means for obtaining, a code region specified to be executed on the second processor, the code region including a plurality of instructions, means for calculating a performance improvement of executing at least one of the plurality of instructions included in the code region on the second processor over executing the at least one instruction on the first processor, means for removing the at least one instruction from the code region in response to a condition including that the performance improvement does not exceed a first threshold, and means for repeating the calculating and the removing to produce a modified code region specified to be executed on the second processor.

The summary clause does not necessarily describe all of the features of the embodiments of the present invention. The present invention may also be a combination or sub-combination of the features described above, including a combination of features from two or more of the aspects described above. The above and other features and advantages of the present invention will become more apparent from the following description of the embodiments, taken in conjunction with the accompanying drawings.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
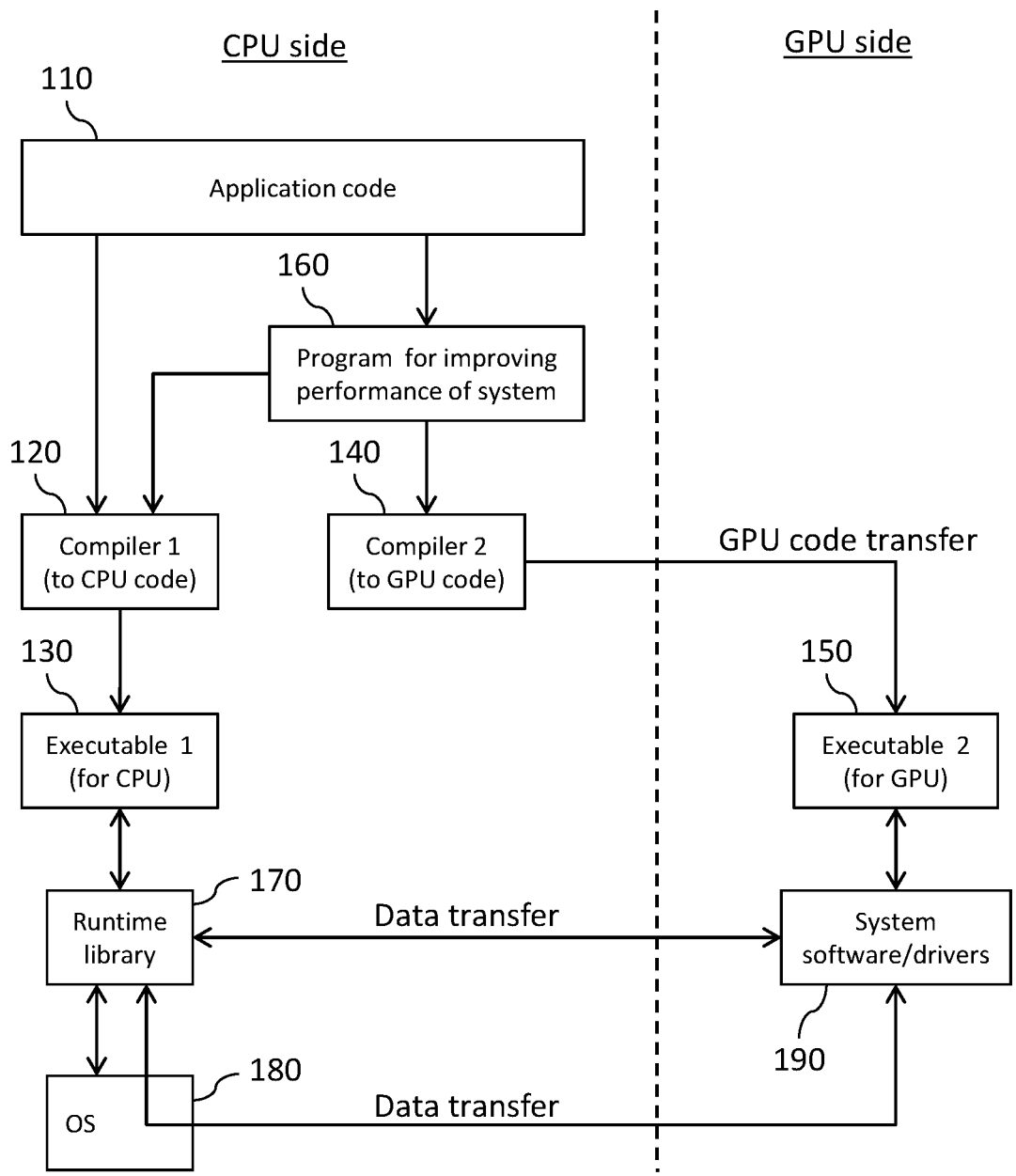
FIG. 1 shows an example software environment according to an embodiment of the present invention.

FIG. 1 shows an example software environment according to an embodiment of the present invention. The software environment may be implemented on a heterogeneous multi-processor system including a primary processor or a main processor as a first processor (or a second processor), and a secondary processor, a sub processor or a co-processor as a second processor (or a first processor), but the software environment can also be implemented on a homogeneous multi-processor system having a plurality of the same processor including a first and a second processor. In the example of FIG. 1, the software environment is implemented on a computer having a CPU as a first processor and a GPU as a second processor. The left side of FIG. 1 represents the CPU side, while the right side (separated by a vertical dashed line) represents the GPU side. On the CPU side, application code 110 is provided from a storage connected to the computer or a remote server computer. The application code 110 may be at least one of source code written in any programming language (e.g. Java, C, or C++), code in any type of intermediate language (e.g. Java byte code, or LLVM), and code in any processor-specific language (e.g. assembler, or machine language). The application code 110 is compiled using a program for improving performance of the system (hereafter "the program") 160, a first compiler ("compiler 1") 120, and a second compiler ("compiler 2") 140 to obtain a first executable ("executable 1") for the CPU and a second executable ("executable 2") for the GPU. In the software environment of FIG. 1, a portion of the application code 110 is compiled by the first compiler 120 to produce the first executable 130 for the CPU, while another portion of the application code 110 is compiled by the second compiler 140 to produce the second executable 150 for the GPU. As shown in FIG. 1, the program 160 intercepts the portion of the application code 110 to be compiled to GPU code. The program 160 may then remove one or more instructions from the intercepted code region and send them to the first compiler 120 while sending the remainder of the intercepted code region to the second compiler 140. By appropriately removing instructions in this way, the program 160 may improve the performance of the system. The second executable 150 compiled by the second compiler 140 is transferred to the GPU side.

In the runtime environment of the CPU side, the first executable 130 may be executed on an operating System (hereafter "OS") 180 using a runtime library 170. The first executable 130 may call library functions in the runtime library 170 or OS functions when necessary. The library functions may include mathematical functions (e.g. sin, cos, log) and communication functions (e.g. send/receive data to/from GPU side or external system connected through a network). The OS functions are provided by the OS 180 and may include communication functions, I/O functions, and/or control functions of the system.

In the runtime environment of the GPU side, the second executable 150 may be executed using system software/drivers 190. The second executable 150 may call the system software/drivers 190, which may be provided by the manufacturer of the GPU, graphics card, or GPU subsystem. The system software/drivers 190 may include graphics functions and communication functions (e.g. send/receive data to/from CPU side).

As shown in FIG. 1, the CPU side and GPU side can transfer data between the runtime library 170 and the system software/drivers 190 through the OS 180, or directly without using the OS 180 (e.g. direct memory access ("DMA") between main memory in the CPU side and graphics memory in the GPU side).

Figure 2:
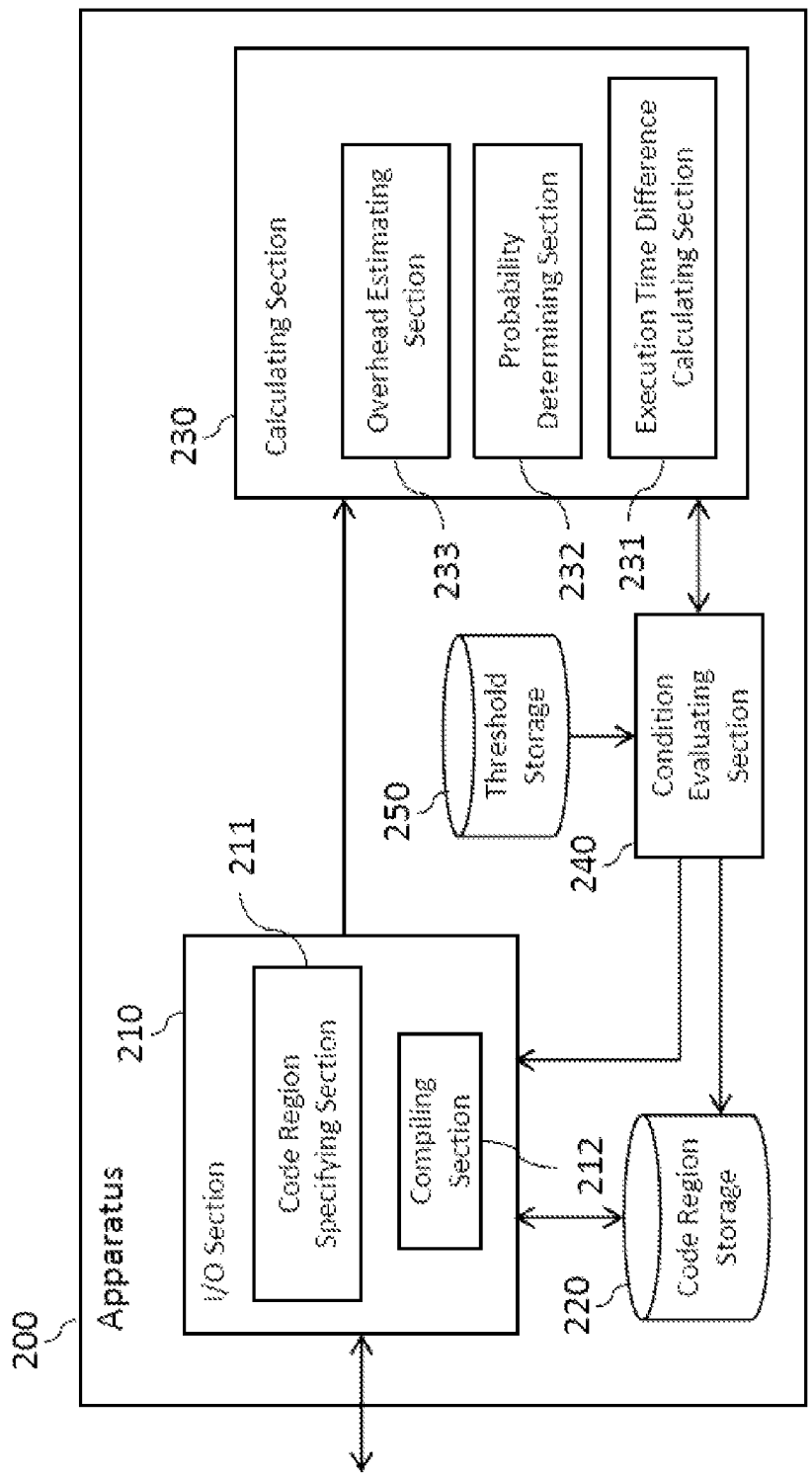
FIG. 2 shows an example apparatus according to an embodiment of the invention.

FIG. 2 shows an example apparatus 200 according to an embodiment of the invention. The apparatus 200 may execute the program 160 of FIG. 1 to improve the performance of a system including a first processor, such as the CPU described with reference to FIG. 1, and a second processor, such as the GPU described with reference to FIG. 1. The system may include the apparatus 200 or may be external to the apparatus 200.

The apparatus 200 obtains a code region specified to be executed on the second processor, calculates a performance improvement of executing at least one instruction included in the code region on the second processor rather than the first processor, and removes or leaves the at least one instruction based on the performance improvement. By repeating the calculating and removing, the apparatus 200 produces a modified code region specified to be executed on the second processor. The removed instructions are instead specified to be executed on the first processor. In this way, the apparatus 200 trims or prunes the code region to improve the performance of the system. The apparatus 200 includes an I/O section 210, a code region storage 220, a calculating section 230, a condition evaluating section 240, and a threshold storage 250.

The I/O section 210 obtains a code region specified to be executed on the second processor, the code region including a plurality of instructions. The code region may be a region of bytecode that can be processed by a virtual machine and compiled into machine code. For example, the code region may be a region of Java bytecode that can be processed by a Java virtual machine. In this case, the plurality of instructions may include any Java bytecode instructions, including instructions for calling a virtual method, accessing an instance variable, class hierarchy check, exception throwing, operation to get a call stack, etc. Alternatively, the code region may be a region of source code written in any human-readable programming language. In the example of the apparatus 200 shown in FIG. 1, the I/O section 210 includes a code region specifying section 211 and a compiling section 212.

The I/O section 210 may receive, from outside the apparatus 200, a set of instructions, e.g. the application code 110 shown in FIG. 1, in which no code region has been specified for execution on the second processor. For example, the I/O section 210 may access a storage external to the apparatus 200 or otherwise receive the set of instructions from a part of the system external to the apparatus 200 or a computer or server external to the system through a network such as the Internet, WAN, and/or LAN. The code region specifying section 211 may then specify the code region by known methods. For example, the code region specifying section 211 may evaluate a parallelization of a candidate code region. As another example, the code region specifying section 211 may refer to user-specified comments in the set of instructions, where a user has specified a code region to be executed on the second processor. In the case where the second processor is a GPU, the code region specifying section 211 may specify the code region to be executed on the second processor by designating a candidate code region having a high degree of parallelization as the code region to be executed on the second processor. In this way, the I/O section 210 may obtain the code region by specifying a code region of a larger input set of instructions. Alternatively or additionally, the I/O section 210 may obtain the code region specified to be executed on the second processor by receiving a pre-specified code region from outside the apparatus 200 in the same ways that a larger set of instructions may be received. For example, the I/O section 210 may receive a pre-specified code region by accessing a storage external to the apparatus 200 or otherwise receiving the code region from a part of the system external to the apparatus 200 or a computer or server external to the system through a network such as the Internet, WAN, and/or LAN. The apparatus 200 may intercept a pre-specified code region that is en route to be compiled to machine code of the second processor, e.g. by the second compiler 140 of FIG. 1. In a case where the I/O section 210 only receives pre-specified code regions from outside the apparatus 200, the code region specifying section 211 can be omitted.

Upon obtaining the code region, the I/O section 210 may provide the code region to the calculating section 230 and store a copy of the code region in the code region storage 220. After no further instructions are to be removed from the code region stored in the code region storage 220, e.g. upon notification by the condition evaluating section 240 that a repeat condition is no longer satisfied as described below, the I/O section 210 may retrieve the modified code region from the code region storage 220. The compiling section 212 may then compile the instructions included in the modified code region, thereby producing an executable for the second processor. In the case where the second processor is a GPU, the compiling section 212 may, for example, compile the instructions to GPU code. In the example shown in FIG. 2, the function of the second compiler 140 of FIG. 1 is included in the apparatus 200 by virtue of the compiling section 212. However, the I/O section 210 may alternatively or additionally output the retrieved modified code region without first compiling it. In a case where the I/O section 210 only outputs the modified code region without first compiling it, the compiling section 212 can be omitted.

After the modified code region is executed on the second processor, the control sequence for executing the larger set of instructions (e.g. the application code 110 of FIG. 1) must be transferred from the second processor side to the first processor side. Therefore, when outputting the modified code region, before compiling the modified code region, or after compiling the modified code region, the apparatus 200 (e.g. the I/O section 210) may insert a switching instruction or set of instructions that switches execution from the second processor to the first processor. The switching instruction(s) may include instruction(s) to transfer a portion or all of the data relating to the application code 110 from the second processor memory (e.g. GPU memory) to the first processor memory (e.g. main memory), instruction(s) to trigger the first processor to start or continue execution of instructions following the code region, and/or instruction(s) to transit the second processor to an idle state. Triggering can be performed by sending a message to the first processor by means of an interrupt or by changing a flag or other data in the first processor memory to indicate that the first processor can start executing the instructions following the code region. The execution of the code region may be ended after executing the last instruction of the code region or by means of a jump, call, return, or any other instruction that exits the code region. Alternatively, the switching instruction(s) can be a jump or call to a switching function in system software/runtime library in the second processor side (e.g. the runtime library 170 of FIG. 1). Similarly, a switching instruction or set of instructions to switch from the first to the second processor may be inserted by the apparatus 200 (e.g. the I/O section 210) at the beginning of execution of the code region obtained by the apparatus 200. In an alternative implementation, instead of inserting the switching instruction, the apparatus 200 may insert a synchronizing instruction that synchronizes executions on the first processor and the second processor so that the first and second processors can execute posterior instructions in parallel.

The I/O section 210 may, on behalf of the apparatus 200, receive commands and data, e.g. settings, values of thresholds, etc. through any combination of input device(s). For example, the input section 210 may be configured to receive mouse input, keyboard input, touchscreen input, eye tracking input, voice commands, and/or gestures. The input section 210 may receive commands and data from a remote user terminal or a remote user device.

The code region storage 220 stores the code region obtained by the I/O section 210. For example, the code region storage 220 may first store a copy of the code region as originally obtained by the I/O section 210, subsequently store, in place of the originally stored code region, an updated version of the code region with one or more instructions having been removed by the condition evaluating section 240 as described below, and finally store, in place of the updated version of the code region, the modified code region from which no further instructions are to be removed. Alternatively, the code region storage 220 may maintain copies of the originally stored code region and the modified code region, and may maintain copies of all intermediate updated version of the code region. The code region storage 220 may temporarily store one or more versions of only a single code region obtained by the I/O section 210, to be replaced by version(s) of a subsequently obtained code region. Alternatively, the code region storage 220 may store one or more versions of all obtained code regions of a larger set of instructions such as the application code 110 of FIG. 1.

The calculating section 230 calculates a performance improvement of executing at least one of the plurality of instructions included in the obtained code region on the second processor over executing the at least one instruction on the first processor. The calculating section 230 may further calculate a code region performance improvement of executing the plurality of instructions on the second processor over executing the plurality of instructions on the first processor. That is, in addition to calculating a performance improvement with respect to at least one of the plurality of instructions included in the obtained code region (an "instruction performance improvement" or "IPI"), the calculating section 230 may also calculate a performance improvement with respect to the entire code region (a "code region performance improvement" or "CRPI"). Upon being provided a code region obtained by the I/O section 210, the calculating section 230 may calculate the IPI of at least one instruction, e.g. the first instruction or predetermined number of successive instructions in the code region, calculate the CRPI, and provide the calculated IPI (including information indicating the corresponding at least one instruction) and CRPI to the condition evaluating section 240. Thereafter, if a repeat condition is satisfied as described below, the calculating section 230 may calculate the IPI of another at least one instruction, e.g. the second instruction or predetermined number of successive instructions of the code region. Or, in a case where the previous at least one instruction has been removed by the condition evaluating section 240 and the I/O section 210 has provided an updated code region to the calculating section 230 as described below, the calculating section 230 may calculate the IPI of the first instruction or predetermined number of successive instructions of the updated code region in response to the repeat condition being satisfied. In the latter case, the calculating section 230 may further calculate a new CRPI for the updated code region. The calculating section 230 may then provide the new IPI and new CRPI (if any) to the condition evaluating section 240. The calculating section 230 includes an execution time difference calculating section 231, a probability determining section 232, and an overhead estimating section 233.

The execution time difference calculating section 231 calculates a difference in execution time between executing the at least one instruction on the first processor and executing the at least one instruction on the second processor. To calculate the difference in execution time, the execution time difference calculating section 231 may estimate a first processor execution time of executing the at least one instruction on the first processor by known methods, estimate a second processor execution time of executing the at least one instruction on the second processor by known methods, and subtract the second processor execution time from the first processor execution time to yield the difference in execution time. For example, in the case where the first processor is a CPU, the execution time difference calculating section 231 may estimate the first processor execution time by using a model generated from features of the at least one instruction, such as by the method described in Dubach, Christophe et al., "Fast Compiler Optimisation Evaluation Using Code-Feature Based Performance Prediction," CF '07 Proceedings of the 4th international conference on Computing frontiers, New York, N.Y., 2007, pp. 131-142 ("Dubach"). In the case where the second processor is a GPU, the execution time difference calculating section 231 may estimate the second processor execution time by using a model generated from features of the at least one instruction, such as by the method described by Baghsorkhi, Sara S. et al., "An Adaptive Performance Modeling Tool for GPU Architectures," Proceedings of the 15th ACM SIGPLAN Symposium on Principles and Practice of Parallel Programming (PPoPP '10), New York, N.Y., 2010, pp. 105-114 ("Baghsorkhi"), or by using a machine learning approach, such as by the method described by Wu, Gene et al, "GPGPU Performance and Power Estimation Using Machine Learning," 2015 IEEE 21st International Symposium on High Performance Computer Architecture (HPCA), Burlingame, Calif., 2015, pp. 564-576 ("Wu"). The calculated difference in execution time may be provided to the condition evaluating section 240 as the IPI or may be used to calculate the IPI or CRPI as described below.

The probability determining section 232 determines a probability that the at least one instruction would be executed if the code region were executed. Depending on other surrounding instructions in the code region, the conditions for executing the at least one instruction may not always be met when the code region is executed. The probability can be determined by analyzing the code region by known methods. The probability can be determined based on a previous execution (e.g. test execution) of the application code. The determined probability may be provided to the condition evaluating section 240 in addition to the IPI or may be used to calculate the IPI or CRPI as described below.

The overhead estimating section 233 estimates an overhead of executing the at least one instruction on the second processor, the overhead including at least one of an estimated pre-execution time and an estimated post-execution time. For example, the estimated overhead may include an estimated time for transferring data referenced by the at least one instruction between a first storage accessible by the first processor and a second storage accessible by the second processor. As a specific example in the case where the first processor is a CPU, the second processor is a GPU, and the code region is a region of Java bytecode, certain instructions such as instructions for calling a virtual method, accessing an instance variable, class hierarchy check, exception throwing, operation to get a call stack, etc. may require transfer of data defining Java classes from the CPU side to the GPU side in addition to transfer of data for arrays. The estimated overhead may include the time required for such additional data transfer. The estimated overhead may further include, for example, time to launch a GPU kernel, time to allocate GPU device memory, and/or time to compile the at least one instruction if the at least one instruction is compiled in runtime, and may be estimated as, for example, the sum of these times and the data transfer time. A method of determining the time to launch a GPU kernel may include, for example, summing a constant time and a time proportional to the number of arguments of the GPU kernel. The overhead can be estimated based on a previous execution (e.g. test execution) of the application code. The estimated overhead may be provided to the condition evaluating section 240 in addition to the IPI or may be used to calculate the IPI or CRPI as described below.

It should be noted that, in the case where the calculating section 230 calculates the CRPI, i.e. the performance improvement for the entire code region, the execution time difference calculating section 231, probability determining section 223, and overhead estimating section 233 function in the same way as described above, but with the at least one instruction in question being the plurality of instructions of the code region, i.e. the instructions as a unit (e.g. the first instruction of the code region), not necessarily every individual instruction since some instructions in the code region may be conditional on others. In the case of the probability determining section 232 determining the probability that the plurality of instructions of the code region would be executed if the code region were executed, it can be assumed that the probability is equal to one by the assumption that the code region is executed. Alternatively, instructions from surrounding code regions in the larger set of instruction (e.g. the application code 110 of FIG. 1) can be considered to analyze the conditions for the code region's execution.

The condition evaluating section 240 removes the at least one instruction from the code region in response to a condition including that the performance improvement does not exceed a first threshold. For example, in a case where the calculated difference in execution time of the at least one instruction is provided to the condition evaluating section 240 as the IPI, the first threshold may be a threshold difference in execution time, e.g. 0. Thus, in the specific example where the calculated difference in execution time is the IPI and the threshold is 0, a sub-condition included in the removal condition is satisfied when the first processor execution time is equal to or less than the second processor execution time. In a simple case, this sub-condition may be the entirety of the removal condition, and thus the condition evaluating section 240 would remove the at least one instruction from the code region specified to be executed on the second processor if the execution time on the first processor is no greater than the execution time on the second processor.

In a case where the determined probability of the at least one instruction, the estimated overhead of the at least one instruction, and/or the CRPI is provided to the condition evaluating section 240 in addition to the IPI, the removal condition may further include the additional sub-condition(s) that the estimated overhead exceeds a second threshold, that the determined probability does not exceed a third threshold, and/or that the CRPI does not exceed a fourth threshold. When all sub-condition(s) of the removal condition are satisfied, the condition evaluating section 240 may remove the at least one instruction from the code region.

In a case where the determined probability of the at least one instruction and/or the estimated overhead of the at least one instruction is used to calculate the IPI rather than being provided to the condition evaluating section 240 in addition to the IPI, the first threshold may be a threshold IPI, e.g. a value at which the IPI indicates no performance improvement of executing the at least one instruction on the second processor over executing the at least one instruction on the first processor. In such case as well, a sub-condition included in the removal condition may be met when the IPI does not exceed the first threshold. This sub-condition may be the entirety of the removal condition, and thus the condition evaluating section 240 would remove the at least one instruction from the code region specified to be executed on the second processor if the IPI (including the results of the execution time difference calculating section 231, probability determining section 232, and/or, overhead estimating section 233) did not exceed the first threshold. In this latter case in which the calculated difference in execution time, the determined probability, and/or estimated overhead may be used to calculated the IPI, the CRPI may still be provided separately to the condition evaluating section 240 in addition to the IPI. The removal condition may further include the sub-condition that the CRPI does not exceed the fourth threshold.

As described above, the removal condition may in either of the above cases include the sub-condition that the CRPI does not exceed the fourth threshold. The fourth threshold may be, for example, a value at which the CRPI indicates no performance improvement of executing the plurality of instructions on the second processor over executing the plurality of instructions on the first processor, e.g. 0. Thus, before removing the at least one instruction in question, the condition evaluating section 240 may check whether there is any performance improvement of executing the plurality of instructions of the code region as a unit on the second processor relative to the first processor. If there is, the condition evaluating section 240 may evaluate the removal condition in the negative, i.e. decide not to remove the one more instructions in question, irrespective of the IPI.

When the condition evaluating section 240 evaluates the removal condition in the positive, i.e. decides to remove the at least one instruction from the code region, the condition evaluating section 240 overwrites the code region stored in the code region storage 220 with an updated code region in which the at least one instruction has been removed or stores such updated code region alongside the previous version of the code region in the code region storage 220. The condition evaluating section 240 may further, in response to the condition, remove from the code region all instructions in the code region succeeding the at least one instruction. This may be useful in environments where communication methods between the CPU and the GPU are limited and thus it is not practical to communicate back and forth between the CPU and the GPU while executing the application 110.

In addition to the removal condition, the condition evaluating section 240 may further evaluate a repeat condition. The repeat condition may be, for example, that the CRPI does not exceed the fourth threshold (which may be the same as a sub-condition of the removal condition as described above). Alternatively, the repeat condition may be that no further increase in the CRPI can be obtained, e.g. that the calculating by the calculating section 230 has been performed a predetermined number of times without any removing of instructions by the condition evaluating section 240. When the repeat condition is satisfied, e.g. when the CRPI does not exceed the fourth threshold, the condition evaluating section 240 may instruct the I/O section 210 to retrieve an updated version of the code region from the code region storage 220 and provide the updated version of the code region to the calculating section 230. Or, if the removal condition was not satisfied and there has been no update to the code region, the condition evaluating section 240 may simply instruction the calculating section 230 to proceed to the next at least one instruction of the same code region. When the repeat condition is not satisfied, e.g. when the CRPI exceeds the fourth threshold, the condition evaluating section 240 may instruct the I/O section 210 that the most recently updated version of the code region stored in the code region storage 220 is the final version, referred to as the modified code region. The I/O section 210 may then compile and/or output the modified code region as described above. The I/O section may further output the removed instructions (e.g. the instructions in the modified code region but not in the originally specified code region) so that the removed instructions can be executed on the first processor. In this way, the apparatus 200 may repeat the calculating and the removing to produce a modified code region specified to be executed on the second processor and the repeating may be performed until the CRPI exceeds the fourth threshold.

The threshold storage 250 stores various thresholds used by the condition evaluating section 240. For example, the threshold storage 250 may store the first threshold, second threshold, third threshold, and fourth threshold described above, to be referred to by the condition evaluating section 240 in evaluating the removal and repeat conditions. The first, second, third, and fourth threshold may be optimal or adequate values for a target computer system and may be determined accordingly.

Figure 3:
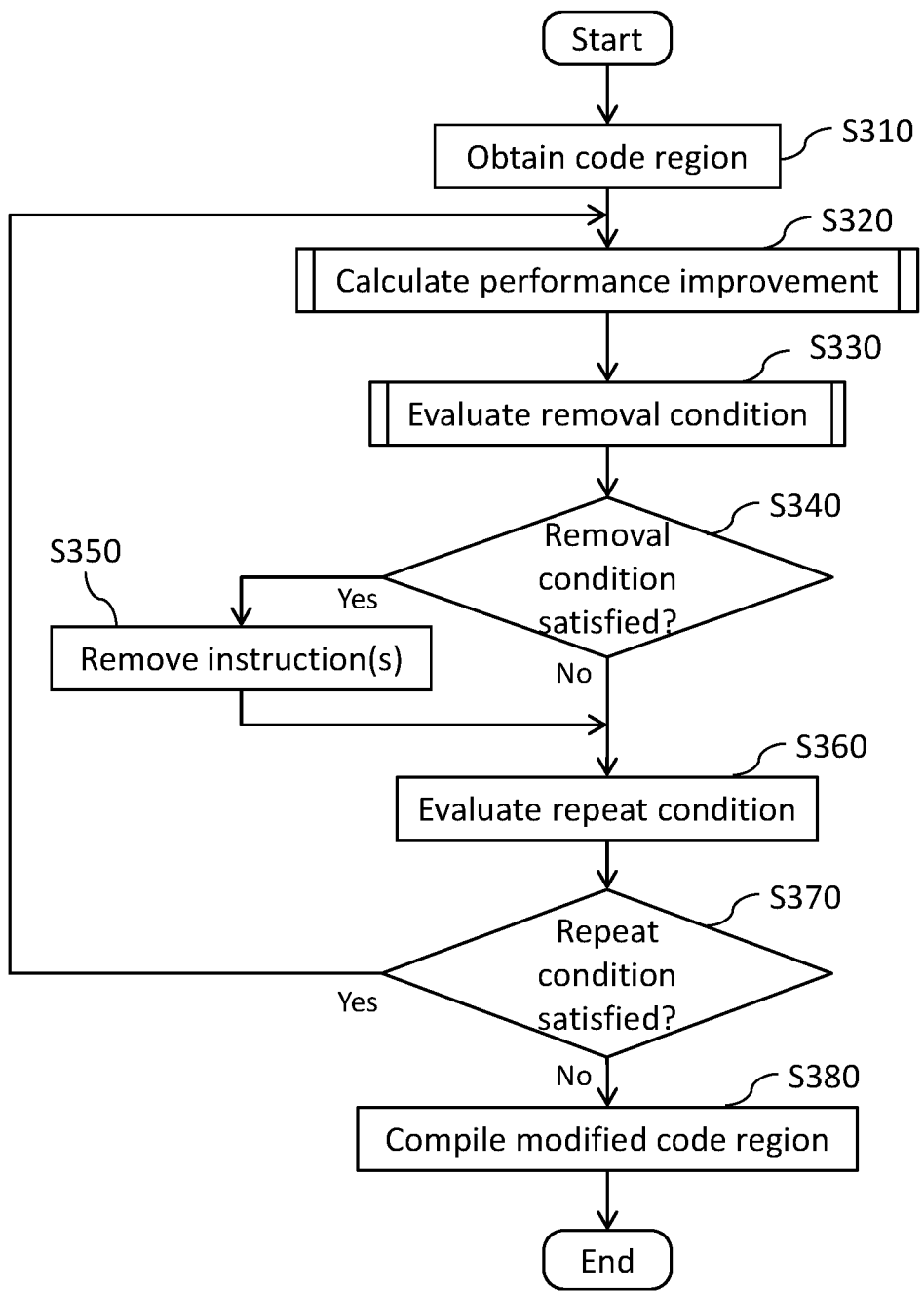
FIG. 3 shows an example operational flow of the apparatus according to an embodiment of the present invention.

FIG. 3 shows an example operational flow of the apparatus 200 according to an embodiment of the present invention. In the example shown in FIG. 3, the apparatus 200 performs the operations from S310 to S380, but the apparatus 200 shown in FIG. 2 is not limited to using this operational flow. Also, the operational flow in FIG. 3 may be performed by a modified apparatus or a different apparatus that differs from the apparatus 200 shown in FIG. 2.

First, the apparatus 200 obtains a code region specified to be executed on the second processor, the code region including a plurality of instructions (S310). For example, the I/O section 210 of the apparatus 200 may receive a pre-specified code region from outside the apparatus 200 or the code region specifying section 211 of the I/O section 210 of the apparatus 200 may specify the code region. The I/O section 210 may provide the code region to the calculating section 230 and store a copy of the code region in the code region storage 220.

Next, the apparatus 200 calculates a performance improvement of executing at least one of the plurality of instructions included in the code region on the second processor over executing the at least one instruction on the first processor (S320). For example, the calculating section 230 of the apparatus 200 may receive the code region from the I/O section 210 and calculate the IPI for at least one instruction of the code region. The calculating section 230 may, in addition to calculating the IPI or as part of calculating the IPI, estimate an overhead of executing the at least one instruction on the second processor and/or determine a probability that the at least one instruction would be executed if the code region were executed. The calculating section 230 may, in addition to calculating the IPI, calculate the CRPI for the code region.

Next, the apparatus 200 evaluates a removal condition for removing the at least one instruction from the code region (S330). For example, the condition evaluating section 240 of the apparatus 200 may compare one or more of the IPI, estimated overhead, determined probability, and CRPI to threshold(s) stored in the threshold storage 250. If the removal condition is not satisfied ("No" at S340), the operation flow proceeds to step S360. If the removal condition is satisfied ("Yes" at S340), the condition evaluating section 240 may remove the at least one instruction (S350) from the code region stored in the code region storage 220 (by rewriting or additionally storing a new version), and then the operation flow proceeds to step S360.

Next, the apparatus 200 evaluates a repeat condition for repeating the calculating and removing (S360). For example, the condition evaluating section 240 of the apparatus 200 may compare the CRPI to a threshold stored in the threshold storage 250. If the repeat condition is satisfied ("Yes" at S370), the operation flow loops back to step S320. For example, if the at least one instruction was not removed ("No" at S340), the condition evaluating section 240 may instruct the calculating section 230 to calculate the performance improvement etc. for the next at least one instruction in the code region. If, on the other hand, the at least one instruction was removed ("Yes" at S340), the condition evaluating section 240 may instruct the I/O section 210 to retrieve the updated code region and provide it to the calculating section 230. In this way, the calculating and the removing are repeated until the repeat condition is not satisfied ("No" at S370), at which point the finally updated code region in the code region storage 220 is referred to as the modified code region.

Finally, once the repeat condition is not satisfied ("No" at S370), the apparatus 200 compiles the modified code region (S380). For example, upon an instruction from the condition evaluating section 240 indicating that no further removals will be made, the compiling section 212 of the I/O section 210 of the apparatus 200 may retrieve the modified code region from the code region storage 220 and compile it to second processor code, e.g. GPU code. The I/O section 210 may then output the second processor code. Alternatively, step S380 may be omitted and the I/O section 210 may simply output the modified code region without first compiling it. In addition, the I/O section 210 may output the removed instructions as first processor code.

Figure 4:
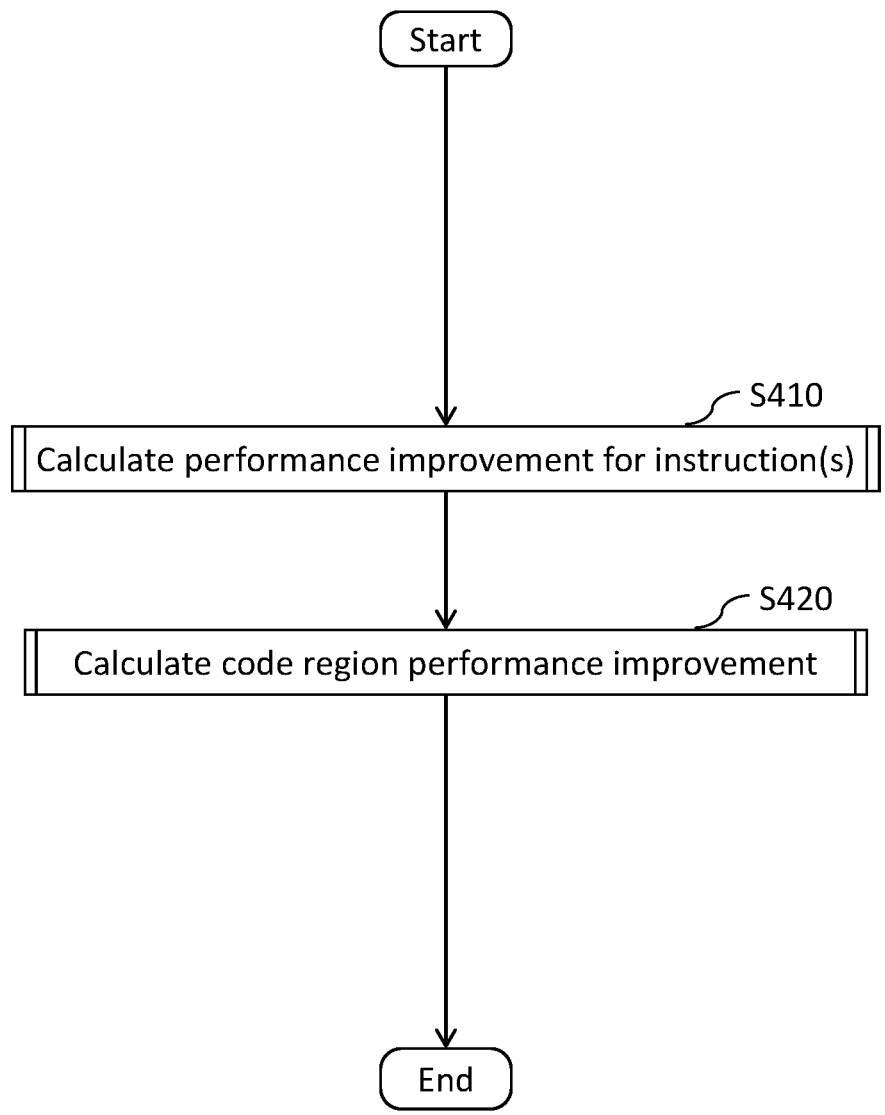
FIG. 4 shows an example operational flow of step S320 in FIG. 3.

FIG. 4 shows an example operational flow of step S320 in FIG. 3. After having obtained the code region in step S310 of FIG. 3, the apparatus 200 calculates the IPI for at least one instruction (S410) and calculates the CRPI for the code region (S420). For example, upon receiving a code region from the I/O section 210 (either an originally obtained code region or an updated code region after a previous at least one instruction has been removed), the calculating section 230 may choose at least one instruction by some predefined rule, e.g. the first instruction or predetermined number of successive instructions in the code region. On the other hand, if the removal condition is not satisfied ("No" at S340) but the repeat condition is satisfied ("Yes" at S370), the calculating section 230 may not receive any new or updated code region. In this case, the calculating section 230 may still choose the at least one instruction by some predefined rule, e.g. the next instruction or predetermined number of successive instructions in the code region. In either case, the calculating section 230 may then calculate the IPI for the chosen at least one instruction. The order of steps S410 and S420 is not important, and the order shown in FIG. 4 is just one example.

Figure 5:
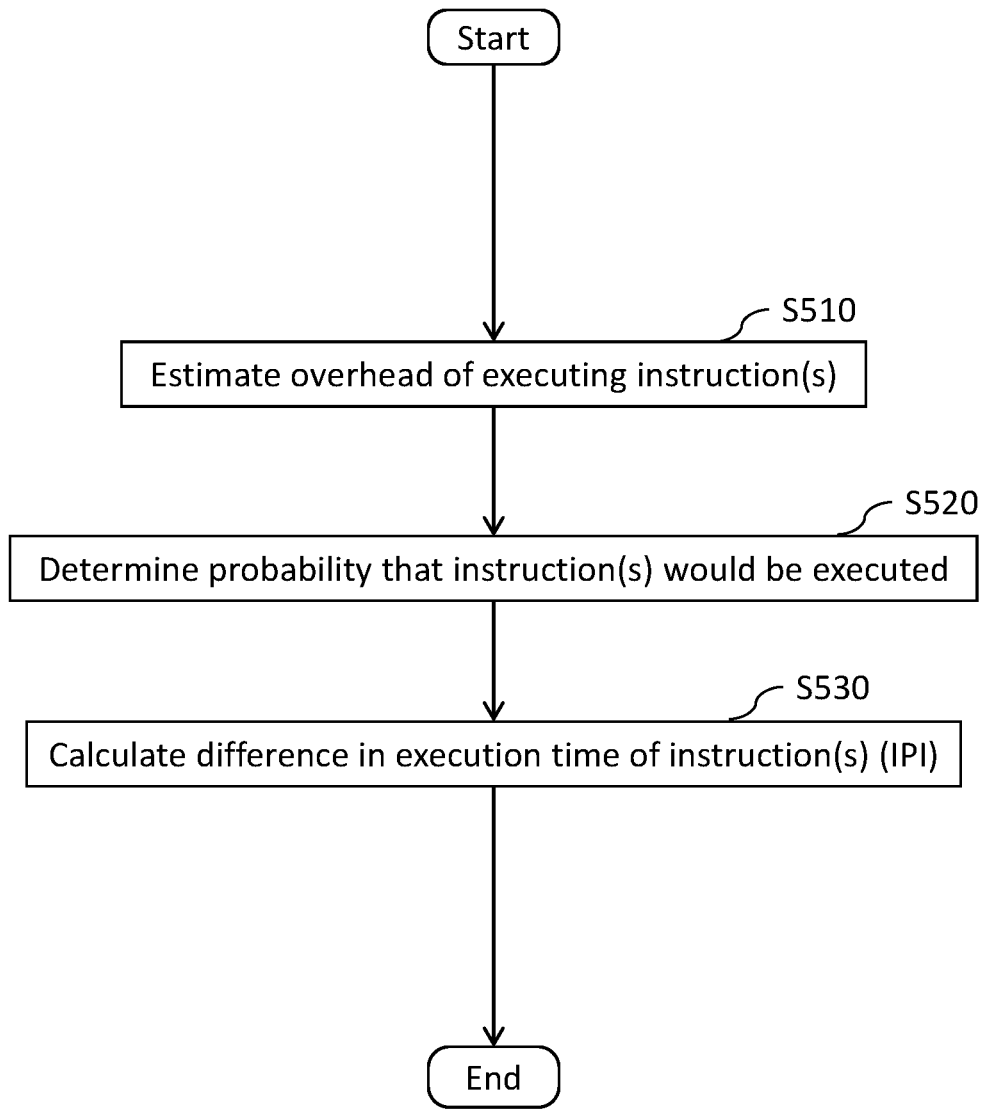
FIG. 5 shows an example operational flow of step S410 in FIG. 4.

FIG. 5 shows an example operational flow of step S410 in FIG. 4. The example of FIG. 5 corresponds to the case where the IPI is calculated as the difference in execution time between executing the at least one instruction on the first processor and executing the at least one instruction on the second processor. As shown, in addition to calculating the difference in execution time (S530), the apparatus 200 estimates an overhead of executing the at least one instruction on the second processor (S510) and determines a probability that the at least one instruction would be executed if the code region were executed (S520). For example, the execution time difference calculating section 231 of the calculating section 230 may calculate the execution time, the probability determining section 232 of the calculating section 230 may determine the probability, and the overhead estimating section 233 of the calculating section 230 may estimate the overhead. The order of steps S510-S530 is not important, and the order shown in FIG. 5 is just one example.

Figure 6:
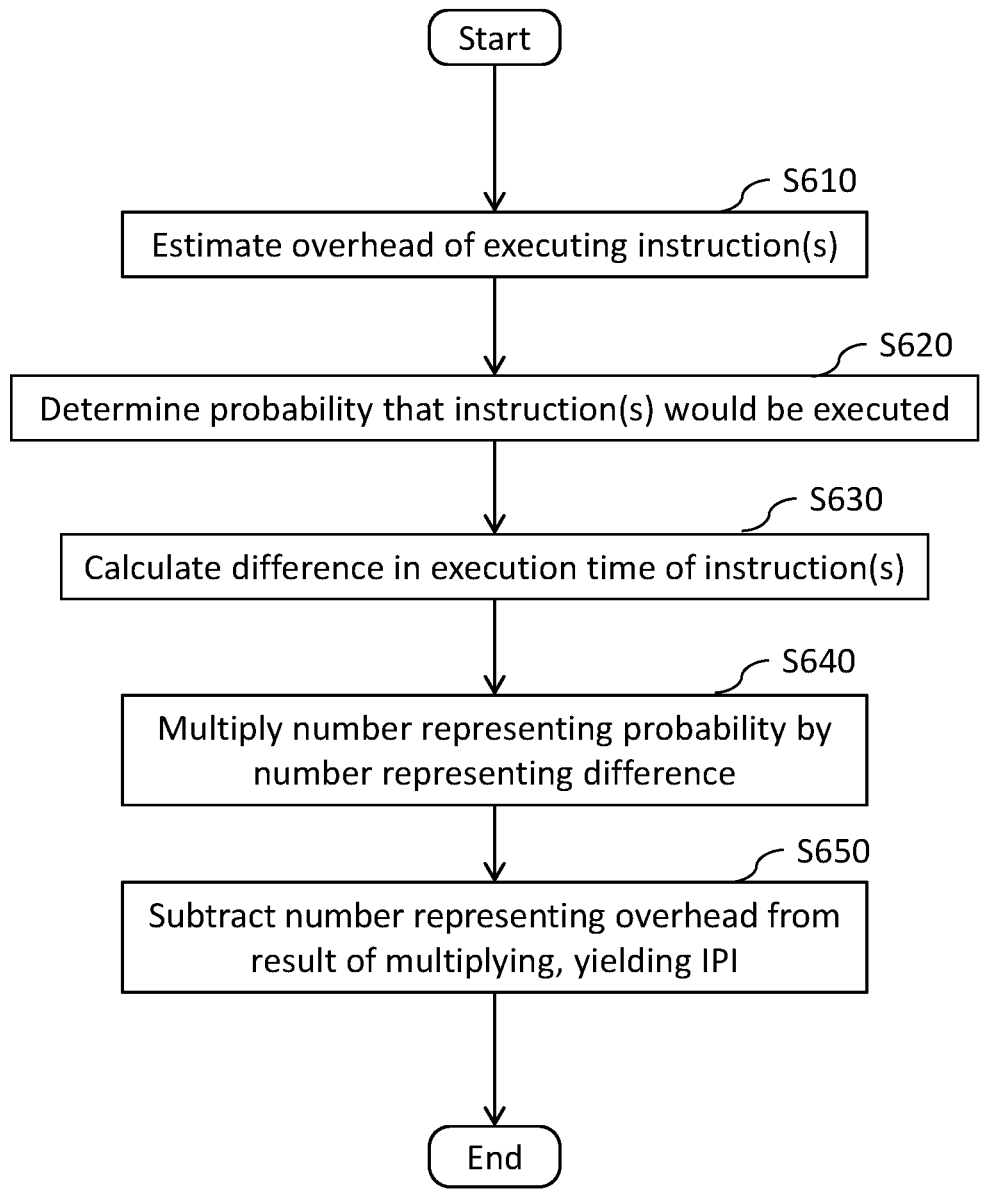
FIG. 6 shows an alternative example operational flow of step S410 in FIG. 4.

FIG. 6 shows an alternative example operational flow of step S410 in FIG. 4. The example of FIG. 6 corresponds to the case where the IPI is calculated not as the difference in execution time between executing the at least one instruction on the first processor and executing the at least one instruction on the second processor, but based on the difference in execution time and other factors. Again, in addition to calculating the difference in execution time (S630), the apparatus 200 estimates an overhead of executing the at least one instruction on the second processor (S610) and determines a probability that the at least one instruction would be executed if the code region were executed (S620). For example, the execution time difference calculating section 231 of the calculating section 230 may calculate the execution time, the probability determining section 232 of the calculating section 230 may determine the probability, and the overhead estimating section 233 of the calculating section 230 may estimate the overhead. However, this time, the results are combined into a single value as the IPI.

After steps S610, S620, and S630, the apparatus 200, e.g. the calculating section 230, multiplies a number representing the determined probability by a number representing the calculated difference (S640). Then, the apparatus 200, e.g. the calculating section 230, subtracts a number representing the estimated overhead from the result of the multiplying, the result of the subtracting being the calculated performance improvement (S650). In this way, the determined probability can serve to "weight" the calculated difference in execution time in accordance with the likelihood that the calculated difference will actually impact performance at execution. Meanwhile, the estimated overhead can serve to modify the weighted difference in execution time to yield an "effective" difference in execution time that takes overhead into consideration. The numbers representing the determined probability, the calculated difference, and the estimated overhead may be, for example, the values of the determined probability, the calculated difference, and the estimated overhead themselves, or may be numbers based on these values, e.g. rounded numbers, normalized numbers, etc.

Similar to steps S510-S530 of FIG. 5, the order of steps S610-S630 is not important, and the order shown in FIG. 6 is just one example. In addition, the particular mathematical operations and order of steps S640 and S650 are not important, and the operations and order shown in FIG. 6 are just one example of combining the various factors into a meaningful value as the IPI.

Figure 7:
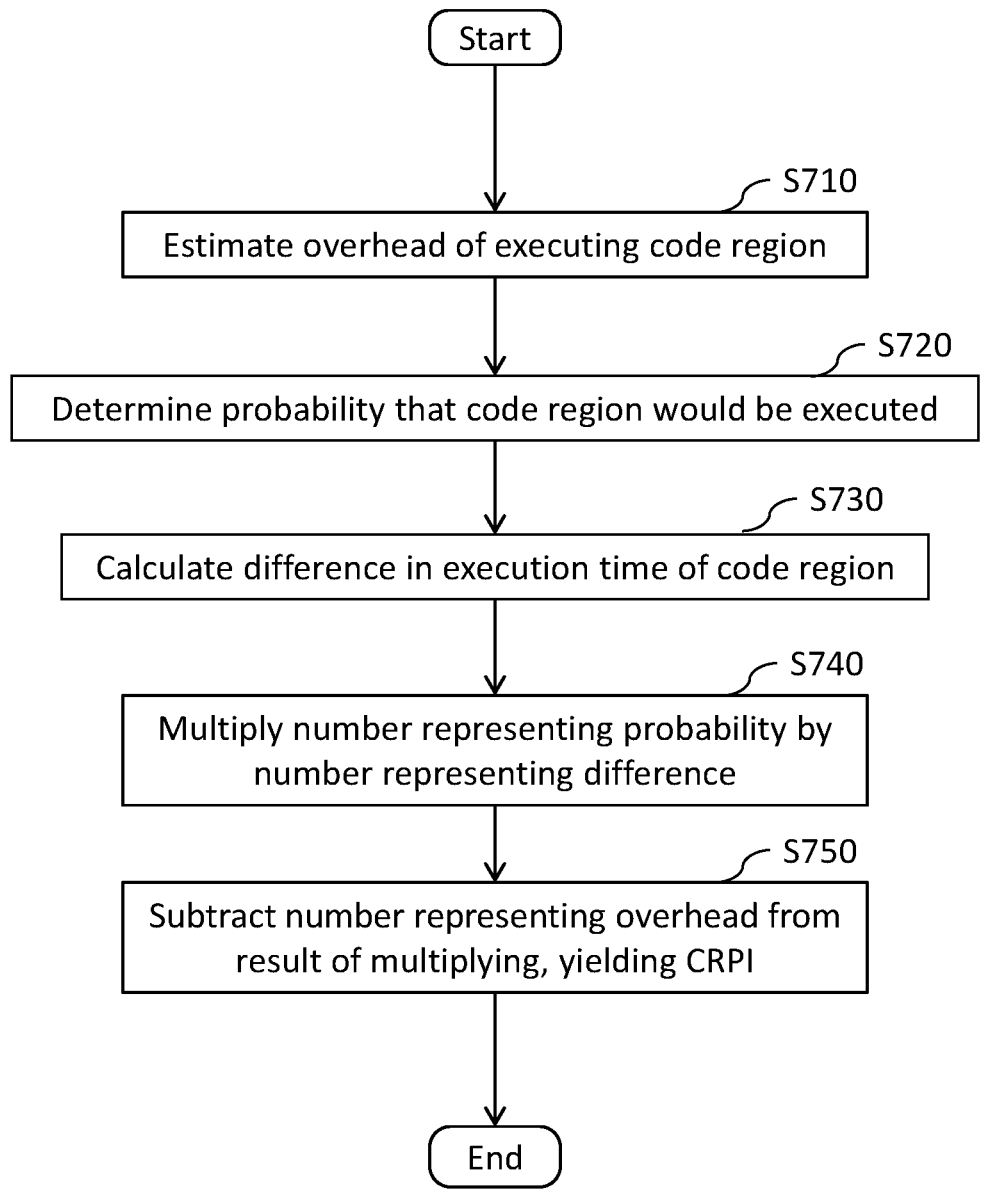
FIG. 7 shows an example operational flow of step S420 in FIG. 4.

FIG. 7 shows an example operational flow of step S420 in FIG. 4. The example of FIG. 7 mirrors the example operational flow of step S410 in FIG. 6, but for the case of calculating the CRPI instead of the IPI. In the example of FIG. 7, the CRPI is calculated as a single value based on several factors. The apparatus 200 estimates an overhead of executing the plurality of instructions of the code region (S710), determines a probability that the plurality of instructions of the code region would be executed if the code region or a larger set of instructions including the code region were executed (S720), and calculates a difference in execution time between executing the plurality of instructions of the code region on the first processor and executing the plurality of instructions of the code region on the second processor (S730). As in the case of calculating the IPI, the execution time difference calculating section 231 of the calculating section 230 may calculate the execution time, the probability determining section 232 of the calculating section 230 may determine the probability, and the overhead estimating section 233 of the calculating section 230 may estimate the overhead.

After steps S710, S720, and S730, the apparatus 200, e.g. the calculating section 230, multiplies a number representing the determined probability by a number representing the calculated difference (S740). Then, the apparatus 200, e.g. the calculating section 230, subtracts a number representing the estimated overhead from the result of the multiplying, the result of the subtracting being the calculated performance improvement (S750). In this way, the determined probability can serve to "weight" the calculated difference in execution time in accordance with the likelihood that the calculated difference will actually impact performance at execution. Meanwhile, the estimated overhead can serve to modify the weighted difference in execution time to yield an "effective" difference in execution time that takes overhead into consideration. The numbers representing the determined probability, the calculated difference, and the estimated overhead may be, for example, the values of the determined probability, the calculated difference, and the estimated overhead themselves, or may be numbers based on these values, e.g. rounded numbers, normalized numbers, etc.

Similar to steps S510-S530 of FIG. 5 and steps S610-630 of FIG. 6, the order of steps S710-S730 is not important, and the order shown in FIG. 7 is just one example. In addition, the particular mathematical operations and order of steps S740 and S750 are not important, and the operations and order shown in FIG. 7 are just one example of combining the various factors into a meaningful value as the CRPI.

It should further be noted that an alternative operational flow of step S420 corresponding to FIG. 5 rather than FIG. 6 is omitted only for the sake of simplicity. Just as FIG. 5 illustrates a case where the IPI is calculated as one of various factors (rather than as a single factor based on various factors), it would be equally possible to calculate the CRPI as one of various factors, e.g. a CRPI equal to a calculated difference in execution time, an additional "code region estimated overhead," an additional "code region determined probability," etc., in a corresponding manner as shown in FIG. 4. Moreover, it should be noted that not every factor in FIGS. 5-7 need be used and that, when only a single IPI factor or CRPI factor is used to evaluate the removal condition in step S340 or when only a single CRPI factor is used to evaluate the repeat condition in step S370, the distinction between these alternative embodiments (e.g. FIG. 5 versus FIG. 6) disappears.

Figure 8:
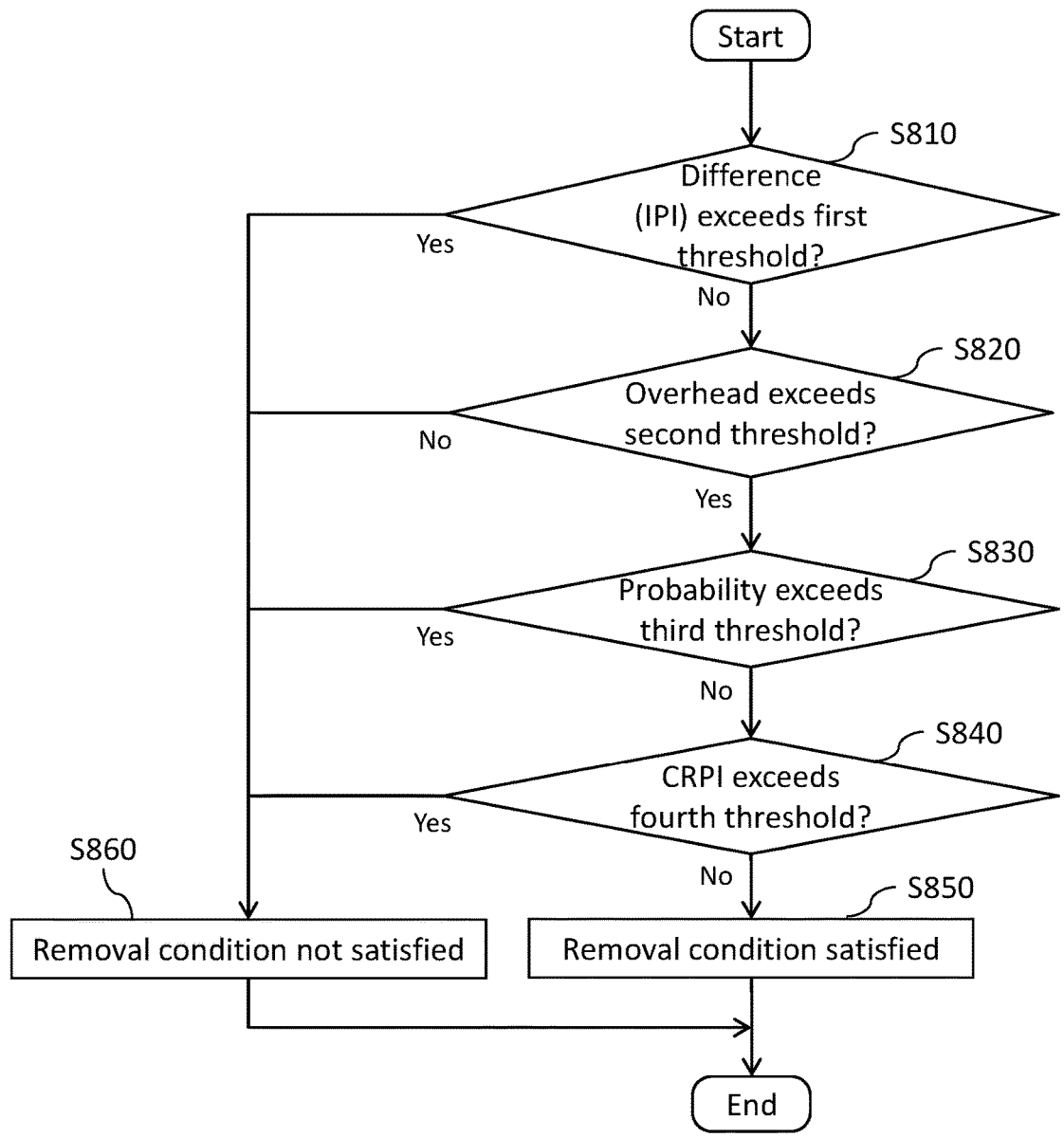
FIG. 8 shows an example operational flow of step S330 in FIG. 3.

FIG. 8 shows an example operational flow of step S330 in FIG. 3. The example of FIG. 8 corresponds to the case where the IPI is calculated as the difference in execution time between executing the at least one instruction on the first processor and executing the at least one instruction on the second processor. That is, the example of FIG. 8 corresponds to a case where step S320 was performed as in FIG. 5 rather than FIG. 6. In such a case, the apparatus 200 may evaluate separate sub-conditions for the overhead estimated in step S510, the probability determined in step S520, and the difference calculated in step S530 (IPI). The apparatus 200 may further evaluate a separate sub-condition for the CRPI calculated in step S420 (or may even further evaluate separate sub-conditions for several CRPI factors as described above). For example, as shown in FIG. 8, the condition evaluating section 240 may evaluate whether the difference in execution time (IPI) calculated in step S530 exceeds a first threshold (S810), whether the overhead estimated in step S510 exceeds a second threshold (S820), whether the probability determined in step S520 exceeds a third threshold (S830), and whether the CRPI calculated in step S420 exceeds a fourth threshold (S840). If all four of these sub-conditions are satisfied, i.e. if the calculated difference does not exceed the first threshold, the estimated overhead exceeds the second threshold, the determined probability does not exceed the third threshold, and the CRPI does not exceed the fourth threshold, then the removal condition is satisfied (S850). If any of the sub-conditions is not satisfied, i.e. "Yes" at S810, "No" at S820, "Yes" at S830, or "Yes" at S840, then the removal condition is not satisfied (S860). In this way, the condition for removing the at least one instruction from the code region may include various sub-conditions in addition to the IPI and CRPI. It should be noted that the order and exact flow of steps S810-S840 is not important, and that they may be ordered differently or combined into intermediate sub-conditions provided that the removal condition meaningfully includes the sub-conditions.

Figure 9:
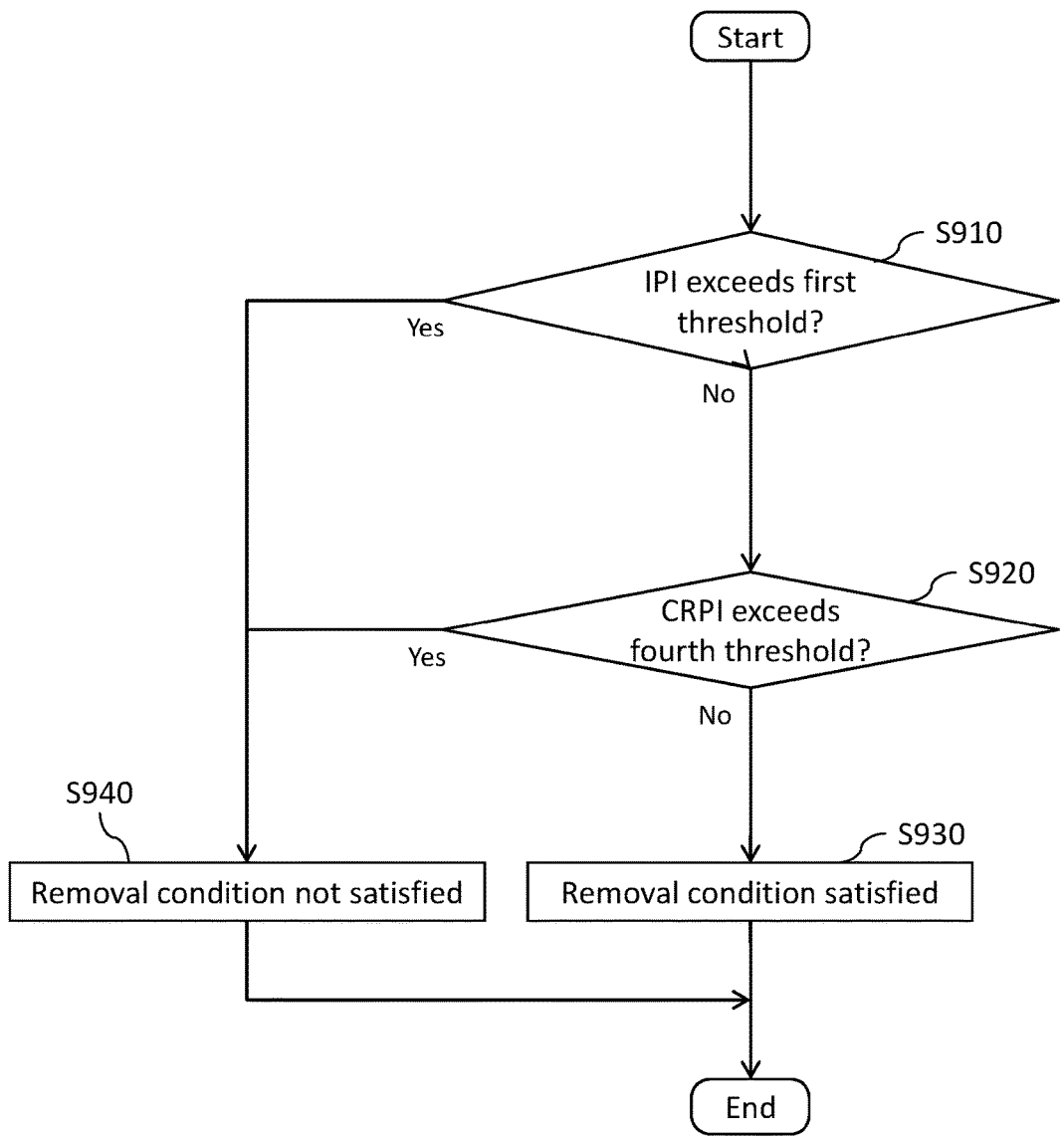
FIG. 9 shows an alternative example operational flow of step S330 in FIG. 3.

FIG. 9 shows an alternative example operational flow of step S330 in FIG. 3. The example of FIG. 9 corresponds to the case where the IPI is calculated not as the difference in execution time between executing the at least one instruction on the first processor and executing the at least one instruction on the second processor, but based on the difference in execution time and other factors. That is, the example of FIG. 9 corresponds to a case where step S320 was performed as in FIG. 6 rather than FIG. 5. In such a case, the apparatus 200 may evaluate a single sub-condition for the IPI, where the IPI is calculated based on the overhead estimated in step S610, the probability determined in step S620, and the difference calculated in step S630. For example, the IPI may be calculated as shown in steps S640 and S650. The apparatus 200 may further evaluate a separate sub-condition for the CRPI calculated in step S420 (or may even further evaluate separate sub-conditions for several CRPI factors as described above). For example, as shown in FIG. 9, the condition evaluating section 240 may evaluate whether the IPI calculated in steps S610-S650 exceeds a first threshold (S910) and whether the CRPI calculated in step S420 exceeds a fourth threshold (S920). If both of these sub-conditions are satisfied, i.e. if the IPI does not exceed the first threshold and the CRPI does not exceed the fourth threshold, then the removal condition is satisfied (S930). If either of the sub-conditions is not satisfied, i.e. "Yes" at S910 or S920, then the removal condition is not satisfied (S940). In this way, the condition for removing the at least one instruction from the code region may include only the IPI and CRPI. It should be noted that the order of steps S910 and S920 is not important.

The examples of FIGS. 5-9 are not intended to be limiting to specific combinations of factors (overhead, probability, etc.) or sub-conditions (overhead exceeds second threshold, probability exceeds third threshold, etc.). Any sub-combination of factors or sub-conditions may also be useful, as may a combination including additional factors or sub-conditions. Additionally, the embodiment of FIGS. 4, 6, and 7 and the embodiment of FIGS. 5, 6, and 8 are intended to be conceptual in nature. Parts of these two conceptual embodiments can be combined in various ways, e.g. IPI can be derived from difference in execution time and overhead, but not probability, such that IPI and probability are separate sub-conditions in a modified version of FIGS. 8 and 9. As noted above, CRPI may similarly be evaluated as one or multiple sub-conditions in any of various practical embodiments.

In the example of the apparatus 200 described with aspect to FIGS. 2-9, the calculating of the performance improvement (IPI or CRPI), removing of the instruction(s), and repeating, e.g. the operations of the calculating section 230 and condition evaluating section 240, are described as occurring prior to compiling the code region. However, these operations or a part of these operations may alternatively or additionally occur after compiling the code region and/or during execution on the first processor or the second processor, e.g. when using just-in-time (JIT) compilation. In this case, the values of run-time variables may be taken into consideration when calculating the factors of the removal condition and repeat condition, e.g. when calculating the difference in execution time, when predicting, the probability, and/or when estimating the overhead (but during execution it is no longer possible to avoid pre-execution overhead by removing instructions from the GPU side).

As can be understood from this disclosure, the features of the apparatus 200 and related embodiments make it possible to avoid the drawbacks associated with conventional systems. The iterative approach of repeating the calculating of the performance improvement (IPI or CRPI) and the removing of the instruction(s) allows the apparatus 200 to trim or prune a code region that is specified to be executed on the second processor (e.g. a GPU), thereby systematically maximizing the efficiency of executing code on the first and second processors while taking into consideration any number of factors (specifically described or not) that might affect or relate to the performance improvement. In this way, the apparatus 200 and related embodiments can improve the performance of a system including a first processor and a second processor.

Figure 10:
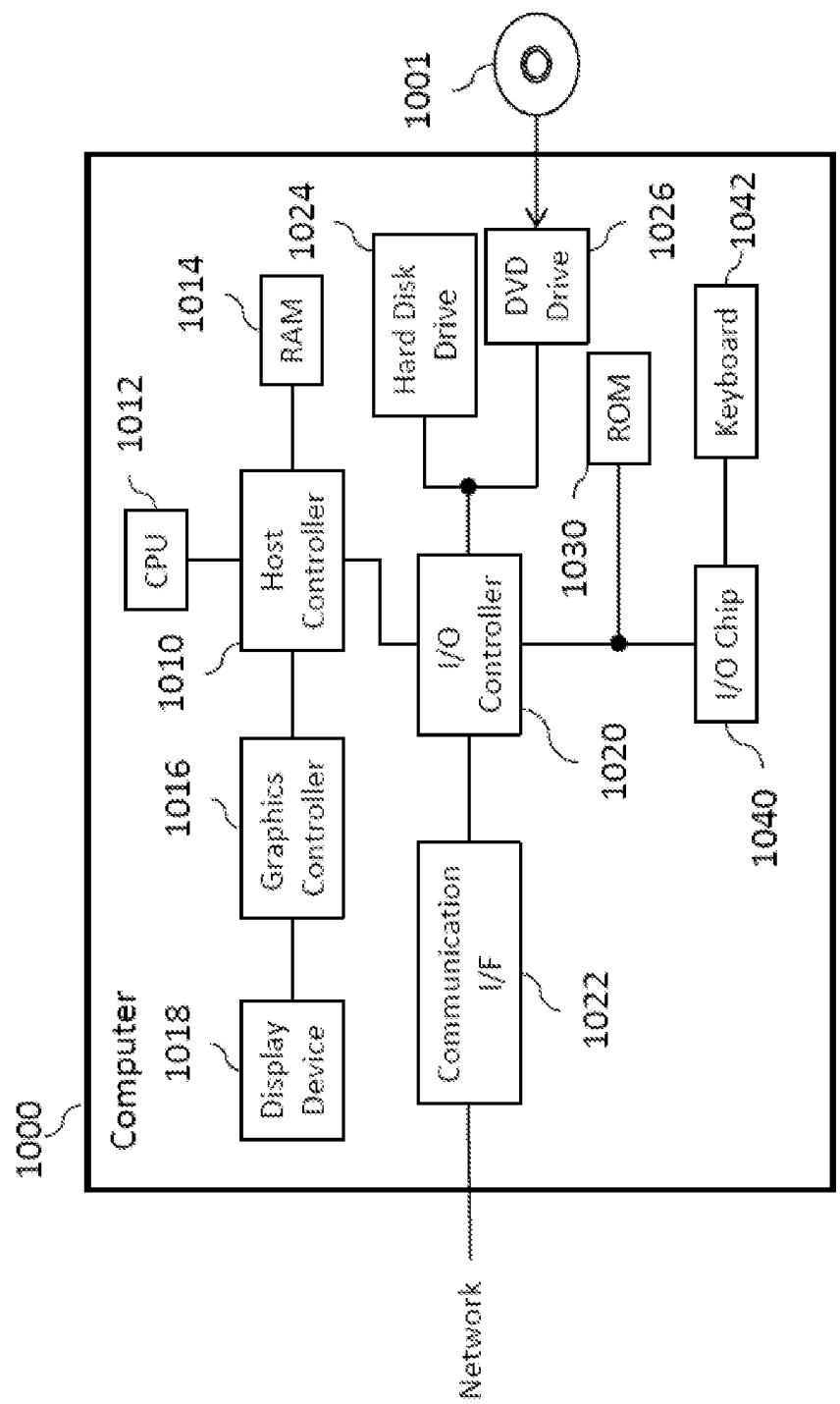
FIG. 10 shows an example of a computer in which the software environment of FIG. 1, the apparatus of FIG. 2, the operational flow of FIG. 3, and/or other embodiments of the claimed invention may be wholly or partly embodied.

FIG. 10 shows an example of a computer 1000 in which the software environment of FIG. 1, the apparatus 200 of FIG. 2, the operational flow of FIG. 3, and/or other embodiments of the claimed invention may be wholly or partly embodied. The computer 1000 according to the present embodiment includes a CPU 1012, a RAM 1014, a graphics controller 1016, and a display device 1018, which are mutually connected by a host controller 1010. The computer 1000 also includes input/output units such as a communication interface 1022, a hard disk drive 1024, and a DVD-ROM drive 1026, which are connected to the host controller 1010 via an input/output controller 1020. The computer also includes legacy input/output units such as a ROM 1030 and a keyboard 1042, which is connected to the input/output controller 1020 through an input/output chip 1040.

The host controller 1010 connects the RAM 1014 with the CPU 1012 and the graphics controller 1016, which access the RAM 1014 at a high transfer rate. The CPU 1012 operates according to programs stored in the ROM 1030 and the RAM 1014, thereby controlling each unit. The graphics controller 1016 obtains image data generated by the CPU 1012 on a frame buffer or the like provided in the RAM 1014, and causes the image data to be displayed on the display device 1018. Alternatively, the graphics controller 1016 may contain therein a frame buffer or the like for storing image data generated by the CPU 1012.

The input/output controller 1020 connects the host controller 1010 with the communication interface 1022, the hard disk drive 1024, and the DVD-ROM drive 1026, which are relatively high-speed input/output units. The communication interface 1022 communicates with other electronic devices via a network. The hard disk drive 1024 stores programs and data used by the CPU 1012 within the computer 1000. The DVD-ROM drive 1026 reads the programs or the data from the DVD-ROM 1001, and provides the hard disk drive 1024 with the programs or the data via the RAM 1014.

The ROM 1030 and the keyboard 1042 and the input/output chip 1040, which are relatively low-speed input/output units, are connected to the input/output controller 1020. The ROM 1030 stores therein a boot program or the like executed by the computer 1000 at the time of activation, a program depending on the hardware of the computer 1000. The keyboard 1042 inputs text data or commands from a user, and may provide the hard disk drive 1024 with the text data or the commands via the RAM 1014. The input/output chip 1040 connects the keyboard 1042 to the input/output controller 1020, and may connect various input/output units via a parallel port, a serial port, a keyboard port, a mouse port, and the like to the input/output controller 1020.

A program to be stored on the hard disk drive 1024 via the RAM 1014 is provided by a recording medium such as the DVD-ROM 1001 or an IC card. The program is read from the recording medium, installed into the hard disk drive 1024 within the computer 1000 via the RAM 1014, and executed in the CPU 1012.

A program that is installed in the computer 1000 can cause the computer 1000 to function as an apparatus such as the apparatus 200 of FIG. 2. Such a program may act on the CPU 1012 to cause the computer 1000 to function as some or all of the sections, components, elements, databases, etc. of the apparatus 200 of FIG. 2 (e.g., the calculating section 230, the condition evaluating section 240, etc.).

A program that is installed in the computer 1000 can also cause the computer 1000 to perform an operational flow such as the operational flow of FIG. 3. Such a program may act on the CPU 1012 to cause the computer 1000 to perform some or all of the steps of FIG. 3 (e.g., calculate performance improvement S320, evaluate removal condition S330, etc.).

The computer 1000 may include the first processor described throughout the above disclosure. For example, the CPU 1012 may be the first processor. The computer 1000 may further include the second processor described throughout the above disclosure. For example, the graphics controller 1016 may be the second processor or may be a graphics subsystem including the second processor (e.g. GPU) and a graphics controller memory.

The information processing described in these programs is read into the computer 1000, resulting in the cooperation between a program and the above-mentioned various types of hardware resources. An apparatus or method may be constituted by realizing the operation or processing of information in accordance with the usage of the computer 1000.

For example, when communication is performed between the computer 1000 and an external device, the CPU 1012 may execute a communication program loaded onto the RAM 1014 to instruct communication processing to the communication interface 1022, based on the processing described in the communication program.

The communication interface 1022, under control of the CPU 1012, reads transmission data stored on a transmission buffering region provided in a recording medium such as the RAM 1014, the hard disk drive 1024, or the DVD-ROM 1001, and transmits the read transmission data to a network or writes reception data received from a network to a reception buffering region or the like provided on the recording medium. In this way, the communication interface 1022 may exchange transmission/reception data with a recording medium by a DMA (direct memory access) method or by a configuration in which the CPU 1012 reads the data from the recording medium or the communication interface 1022 of a transfer destination and writes the data into the communication interface 1022 or the recording medium of the transfer destination, so as to transfer the transmission/reception data.

In addition, the CPU 1012 may cause all or a necessary portion of a file or a database to be read into the RAM 1014 such as by DMA transfer, the file or the database having been stored in an external recording medium such as the hard disk drive 1024, the DVD-ROM drive 1026 (DVD-ROM 1001) and perform various types of processing on the data on the RAM 1014. The CPU 1012 may then write back the processed data to the external recording medium by means of a DMA transfer method or the like. In such processing, the RAM 1014 can be considered to temporarily store the contents of the external recording medium, and so the RAM 1014, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 1012 may also use a part of the RAM 1014 to perform reading/writing thereto on a cache memory. In such an embodiment, the cache is considered to be contained in the RAM 1014, the memory, and/or the recording medium unless noted otherwise, since the cache memory performs part of the function of the RAM 1014.

The CPU 1012 may perform various types of processing on the data read from the RAM 1014, which includes various types of operations, processing of information, condition judging, search/replace of information, etc., as described throughout this disclosure and designated by an instruction sequence of programs, and writes the result back to the RAM 1014. For example, when performing condition judging, the CPU 1012 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 1012 may search for information in a file, a database, etc., in the recording medium. For example, when a plurality of entries, each having an attribute value of a first attribute is associated with an attribute value of a second attribute, are stored in a recording apparatus, the CPU 1012 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 1001, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1000 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be, performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A non-transitory computer readable storage medium comprising a computer readable storage medium having program instructions embodied therewith, the program instructions executable by a processor or programmable circuitry to cause the processor or programmable circuitry to perform operations that compiles code for improving performance of a system including a first processor and a second processor, the operations comprising:

obtaining a code region specified to be executed on the second processor, the code region including a plurality of instructions;

determining a probability that at least one of the plurality of instructions would be executed if the code region were executed;

calculating a performance improvement of executing the at least one of the plurality of instructions included in the code region on the second processor over executing the at least one instruction on the first processor by estimating an overhead of executing the at least one instruction on the second processor, the overhead including at least one of an estimated pre-execution time and an estimated post-execution time;

removing the at least one instruction from the code region in response to a condition including that the performance improvement does not exceed a first threshold and the overhead exceeds a second threshold, with instructions in the code region succeeding the at least one instruction being removed from the code region in response to the condition;

repeating the calculating and the removing to produce a modified code region specified to be executed on the second processor; and compiling an executable for the second processor that includes the modified code region.

2. An apparatus comprising:
the non-transitory computer readable storage medium of claim 1; and
the processor or programmable circuitry for executing the program instructions.

3. An apparatus comprising:
the non-transitory computer readable storage medium of claim 1; and
the first processor, wherein
the first processor executes the program instructions.

4. The apparatus of claim 3, further comprising the second processor.

5. The non-transitory computer readable storage medium of claim 1, wherein the estimated overhead includes an estimated time for transferring data referenced by the at least one instruction between a first storage accessible by the first processor and a second storage accessible by the second processor.

6. The non-transitory computer readable storage medium of claim 1, wherein the condition further includes that the determined probability does not exceed a third threshold.

7. The non-transitory computer readable storage medium of claim 1, wherein the calculating the performance improvement includes calculating a difference in execution time between executing the at least one instruction on the first processor and executing the at least one instruction on the second processor.

8. The non-transitory computer readable storage medium of claim 7, wherein the calculating the performance improvement includes determining a probability that the at least one instruction would be executed if the code region were executed on the second processor.

9. The non-transitory computer readable storage medium of claim 8, wherein the calculating the performance improvement includes:
determining a probability that the at least one instruction would be executed if the code region were executed on the second processor;
multiplying a number representing the determined probability by a number representing the calculated difference; and
subtracting a number representing the estimated overhead from the result of the multiplying, the result of the subtracting being the calculated performance improvement.

10. The non-transitory computer readable storage medium of claim 1, wherein
the calculating the performance improvement includes calculating a code region performance improvement of executing the plurality of instructions on the second processor over executing the plurality of instructions on the first processor, and
the condition further includes that the code region performance improvement does not exceed a fourth threshold.

11. The non-transitory computer readable storage medium of claim 10, wherein the repeating is performed until the code region performance improvement exceeds the fourth threshold.

12. The non-transitory computer readable storage medium of claim 10, wherein the fourth threshold is a value at which the code region performance improvement indicates no performance improvement of executing the plurality of instructions on the second processor over executing the plurality of instructions on the first processor.

13. The non-transitory computer readable storage medium of claim 1, wherein the first processor is a central processing unit (CPU) and the second processor is a graphics processing unit (GPU).

14. The non-transitory computer readable storage medium of claim 1, wherein the obtaining includes specifying the code region.

15. The non-transitory computer readable storage medium of claim 14, wherein the specifying includes evaluating a parallelization of a candidate code region.

16. A non-transitory computer readable storage medium comprising a computer readable storage medium having program instructions embodied therewith, the program instructions executable by a processor or programmable circuitry to cause the processor or programmable circuitry to perform operations for improving performance of a system including a first processor and a second processor, the operations comprising:

obtaining a code region specified to be executed on the second processor, the code region including a plurality of instructions;

estimating an overhead of executing the at least one of the plurality of instructions on the second processor, the overhead including at least one of an estimated pre-execution time and an estimated post-execution time;

determining a probability that the at least one of the plurality of instructions would be executed if the code region were executed on the second processor if the code region were executed;

multiplying a number representing the probability by a number representing a difference in execution time between executing the at least one instruction on the first processor and executing the at least one instruction on the second processor; and subtracting a number representing the estimated overhead from the result of the multiplying, the result of the subtracting being a calculated performance improvement of executing the at least one of the plurality of instructions included in the code region on the second processor over executing the at least one instruction on the first processor;

removing the at least one instruction from the code region in response to a condition including that the performance improvement does not exceed a first threshold; and repeating the calculating and the removing to produce a modified code region specified to be executed on the second processor.

\* \* \* \* \*